United States Patent
Kobetsky et al.

(10) Patent No.: US 6,860,406 B2
(45) Date of Patent: Mar. 1, 2005

(54) FLEXIBLE POUCH FITMENT STRUCTURE

(75) Inventors: Robert G. Kobetsky, Chicago, IL (US); Art Malin, Northbrook, IL (US)

(73) Assignee: Illinois Tool Works Inc., Glenview, IL (US)

(*) Notice: Subject to any disclaimer, the term of this patent is extended or adjusted under 35 U.S.C. 154(b) by 123 days.

(21) Appl. No.: 09/929,161

(22) Filed: Aug. 13, 2001

(65) Prior Publication Data
US 2003/0029138 A1 Feb. 13, 2003

(51) Int. Cl.[7] .................................. B65D 35/00
(52) U.S. Cl. .............................. 222/92; 222/107
(58) Field of Search .......................... 222/92, 94, 105, 222/107

(56) References Cited

U.S. PATENT DOCUMENTS

| | | | | |
|---|---|---|---|---|
| 3,690,524 A | | 9/1972 | Haberhauer | 222/573 |
| 4,732,299 A | * | 3/1988 | Hoyt | 222/94 |
| 5,911,340 A | | 6/1999 | Uematsu | 222/92 |
| 6,050,451 A | | 4/2000 | Hess, III et al. | 222/92 |
| 6,273,307 B1 | * | 8/2001 | Gross et al. | 222/566 |
| 6,439,429 B1 | * | 8/2002 | Gross | 222/92 |

FOREIGN PATENT DOCUMENTS

| | | |
|---|---|---|
| DE | 297 06 157 U1 | 7/1997 |
| JP | 5-229566 | 9/1993 |
| JP | 2001240083 | 9/2001 |
| WO | WO 96/21599 | 7/1996 |
| WO | WO 98/45190 | 10/1998 |

* cited by examiner

*Primary Examiner*—Joseph A. Kaufman
(74) *Attorney, Agent, or Firm*—Pitney Hardin LLP

(57) ABSTRACT

A flexible plastic fitment for providing spouts for pouches formed of sheet material. The fitment includes a pair of opposed side walls each having a center portion formed from diametrically opposed segments of a common cylinder and straight segments that blend respectively into the cylindrical segments on opposite sides of the common cylinder. The side walls are joined together at both ends thereof to form a canoe shape. A cover, which provides the only support for the side walls joins the top edges of the canoe shape and extends at both ends of the canoe shape between the cylindrical segments and the joined ends. A thin fin extends from each end of the joined side walls. A method of and apparatus for attaching the fitment by distending the side walls outwardly while urging the sheet material toward the side walls is also disclosed.

7 Claims, 3 Drawing Sheets

FLEXIBLE POUCH FITMENT STRUCTURE

BACKGROUND OF THE INVENTION

The present invention relates to fitments and in particular to a spout fitment for a flexible package.

Fitments are often used to provide a pouring spout for containers formed of flexible films. It has heretofore been proposed to use a fitment/spout with a canoe-shaped base that serves to provide a smooth, gradual transition between the plies of film from which the package is to be formed and the pouring spout which is coaxial with the center of the fitment. Common wisdom taught that the fitment canoe section should be relatively rigid so as not to misshape the center spout section when the fitment is subjected to the heat and pressure needed to seal the package film to the fitment. This, in turn, required that the sealing jaws as well as the fitments be precisely sized to assure the formation of tight seals. Frequently it is necessary to attach the fitment with one set of sealing jaws and then seal the pouch film with a second different set of jaws. Unfortunately, in practice, fitments injection molded of polyethylene, polypropylene and the like often vary somewhat dimensionally during manufacture. Also, in time, the sealing jaws wear and such wear may not be uniform. As a result, during such package manufacturing, unreliable welds result and there is a failure to obtain consistent packages. This is counterproductive to the desired production rates for the packages formed utilizing such fitment attachment processes.

The attachment of such fitment is disclosed in U.S. patent application Ser. No. 09/452,714 entitled "Method for Attaching Fitment at Longitudinal Fin Seal and Package Resulting Therefrom" filed on Dec. 2, 1999. A thin wall fitment is disclosed in U.S. patent application Ser. No. 09/643,033 filed Aug. 21, 2000 entitled "Thin Wall Fitment for Spouted Pouch". Other prior art includes U.S. Pat. No. 5,911,340 entitled "Spout Assembly, Spout Assembly Manufacturing Apparatus and Package with Spout Assembly" issued on Jun. 15, 1999 to Uematsu; U.S. Pat. No. 5,716,471 entitled "Method for Securing Articles to Laminates" issued on Feb. 10, 1998 to Pape; U.S. Pat. No. 4,909,434 entitled "Moisture Impervious Carton Having One-Piece Pouring Spout Sealed to Innermost and Outermost Surfaces" issued on Mar. 20, 1990 to Jones et al.; U.S. Pat. No. 3,894,381 entitled "Method and Means for Attaching Fitments to a Bag or Pouch on a Packaging Machine" issued on Jul. 15, 1975 to Christine et al.; and U.S. Pat. No. 5,855,544 entitled "Flexible Container With Tubular Fitment And Method And Apparatus For Assembling Same" issued on Jan. 5, 1999 to Buchanan.

OBJECTS AND SUMMARY OF THE INVENTION

It is a principal object of the present invention to provide an improved fitment with canoe-shaped walls which can be installed at relatively high speeds with a single set of sealing jaws.

A further object is to provide such a fitment wherein the canoe-shaped walls are designed to distort during the installation process so as to facilitate and enhance sealing of the associated package film to the fitment side walls.

A still further object is to provide a method of and apparatus for sealing a fitment to a package film that ensures the formation of tight seals between the fitment and package film.

The above and other beneficial objects and advantages are attained in accordance with the present invention by providing a flexible plastic fitment. The fitment includes side walls having a center portion comprising diametrically opposed segments of a common cylinder and straight segments that blend respectively into the cylindrical segments on opposite sides of the common cylinder and are joined together at both ends thereof in a pointed tip thereby forming a canoe shape. A cover joins the top edges of the canoe shape and extends at both ends of the canoe shape between the cylindrical segments and the pointed tip. A thin fin at each end of said joined side walls, said fins comprising extensions of said pointed tips.

The fitment is attached to an associated film package by inserting the fitment between facing sheets of the film forming the package, substantially aligned with edges of the facing sheets. Prior to that a mandrel is inserted into the center of the common cylinder of the fitment. The mandrel may be dimensioned to distend the fitment side walls' cylindrical segments and straight segments outwardly which causes accurate positioning of these surfaces. While the mandrel is positioned within the common cylinder and distending the cylindrical segments and straight segments of the side walls outwardly, heated sealing jaws close to capture the film sheet edges against the fitment to seal the film edges to the side walls. In this regard, the sealing jaws includes convex sections out-of-line with the mandrel which urge the packaging film inwardly as the sealing jaws close to thereby enhance the contact of the fitment and packaging film and thereby compensate for any dimensional intolerance.

It is usually desirable to simultaneously contact the package film, thus sealing the film surface at the top of the pouch at the same time as attaching the fitment.

DETAILED DESCRIPTION OF THE PREFERRED EMBODIMENT

Figure 1:
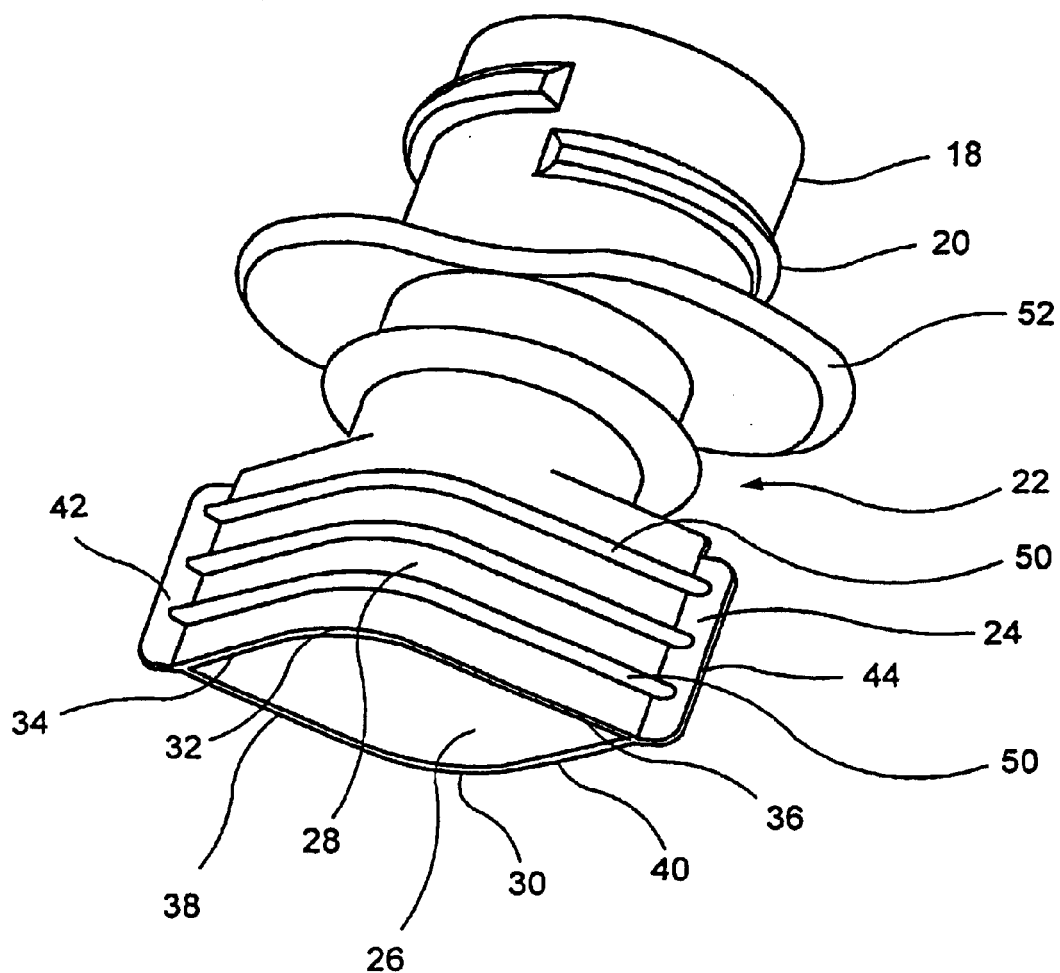
FIG. 1 is a perspective view of a fitment in accordance with the present invention.
Figure 4:
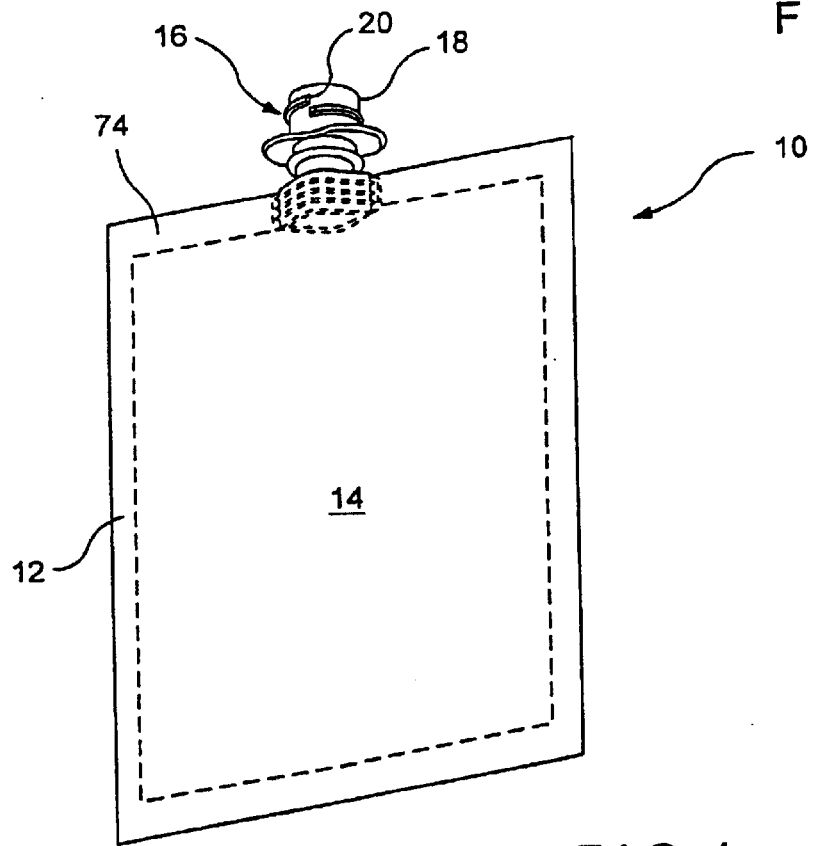
FIG. 4 is a perspective view of a package formed by the sealing equipment of FIG. 2 utilizing the fitment of FIG. 1.

Reference is now made to the drawings and to FIG. 4 in particular wherein a package 10 is depicted. The package is formed of two sheets of a suitable film for the contents to be held. In this regard, the film may be a laminate, the layers of which have desired barrier or other properties for the product to be contained and an appropriate sealant layer for bonding to each other and to the fitment. The sheets are sealed to each other in a zone 12 extending about the package periphery, thereby forming a leak proof inner area 14 into which the package contents are captured. A spout 16 extends from the package top to the inner area 14. The spout 16 conveniently includes a center cylindrical neck 18 which carries external threads 20 for an associated cap. The spout 16 is formed using a fitment 22 as shown in FIG. 1. Fitment 22 is conveniently injection molded of a thermoplastic material such as polyethylene or polypropylene and the canoe section is relatively thin, on the order of 26–28 mils.

Fitment 22 comprises a cylindrical neck 18 which extends upwardly from a canoe-shaped base 24. The canoe-shaped base 24 consists of side walls 26, 28 each of which is formed of a curved center portion 30, 32 into which straight segments 34, 36 and 38, 40 tangentially blend. The side walls 26 and 28 are joined at both ends at a point from which a thin fin 42, 44 extends. It is important to note that there are no internal ribs or gussets supporting the side walls and that the only support comes from cover sections 46, 48 (see FIG. 2 and FIG. 3) at the top of the canoe. As a result the fitment side walls are quite flexible and resilient. To facilitate attaching the fitment to the packaging film a series of raised horizontal ribs 50 extend about the side walls from end to end. Because of the relatively low mass of the ribs 50, they readily fuse with the packaging film when the heated sealing jaws are activated. The speed of the fusing is further assisted by the mass of the canoe side walls 26, 28, 34, 36, 38 and 40 acting as a heat sink to encourage rapid solidification of the ribs as the jaws open. A flange 52 extends radially outwardly from cylindrical neck 18 between the canoe side walls and the area of cap threads 20 of the cylindrical neck. The flange 52 serves to facilitate feeding the fitment for attachment to the packaging film and accordingly is designed to properly orient the fitment during the attachment process.

Figure 2:
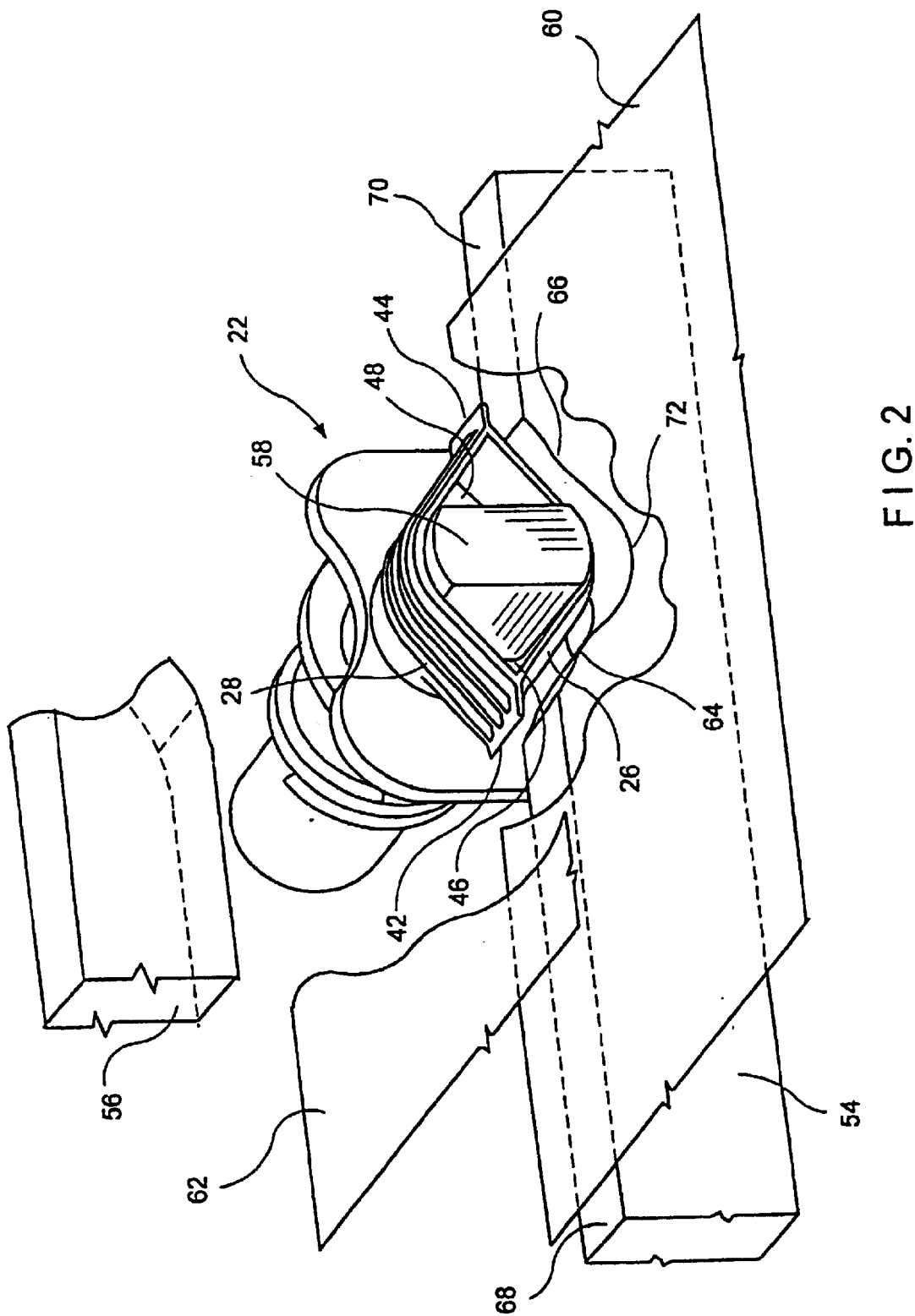
FIG. 2 is a perspective view of the fitment of FIG. 1 in position to be sealed between sheets of a packaging film, for clarity, the top sealing jaw has been partially removed.
Figure 3:
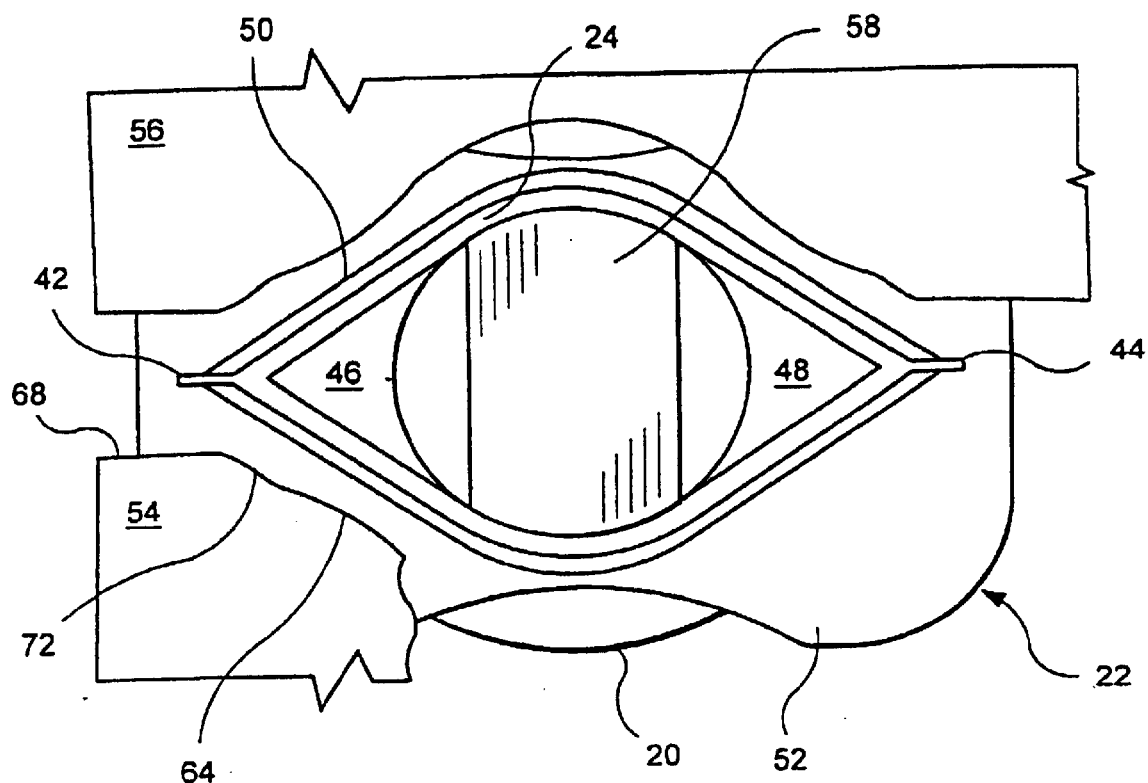
FIG. 3 is a bottom (viewed from the fitment) plan view of the fitment of FIG. 1 in position to be sealed to packaging film, for clarity, the bottom sealing jaw has been partially removed.

Reference is now made to FIG. 2 wherein the sealing jaws 54, 56 and mandrel 58 of the sealing apparatus used to join the fitment 22 to the sheets of packaging film 60, 62 are depicted. It should be appreciated that for clarity only the bottom sealing jaw 54 and bottom film 60 are shown in detail. The top sealing jaw 56, which is identical to the bottom sealing jaw 54, but inverted, and top film 62, are cut away. It will also be appreciated that the mandrel 58 is oblong and oversized. As a result, when the mandrel is inserted into the fitment 22 the side walls 26, 28 are stretched over the mandrel surface providing highly controlled and accurate positioning of that portion of the canoe base. It should be further noted that sealing jaws 54, 56 which have mating sections 72 that are generally contoured to receive the fitment, also have convex sections 64, 66, such convex sections will contact the unsupported sections of the canoe (38, 40) driving heat and pressure into said portions of the canoe until the sealing jaws 54, 56 are clamped on the melting fins 42, 44. As the fins melt away the pouch film surface is pressurized and the top of the pouch is sealed. This results in a highly controlled and predictable relationship which consistently produces a secure seal being formed between the fitment and the packaging sheets even if there are minor dimensional variations or other distortions in the fitment. The sealing jaws 54, 56 further include flat sections 68, 70 on opposite sides of section 72 that is contoured to receive the fitment. When the sealing jaws close, the flat sections 68, 70 seal together the top edges of the packaging film on both sides of the fitment to form the top 74 of the package 14 while simultaneously securing the fitment to the package. In this connection, the fins 42, 44 at the ends of the canoe serve to permit a smooth transition between the sheet sealing and fitment sealing by the jaws. To further facilitate sealing of the film sheets the mandrel may be heated.

Thus, in accordance with the above, the aforementioned objects are effectively attained.

Having thus described the invention, what is claimed is:

1. A flexible plastic fitment comprising:
   a pair of relatively flexible side walls, said side walls each having a center portion comprising diametrically opposed segments of a common cylinder and straight segments tangent to and blending respectively into said cylindrical segments, said side walls being joined together at both ends thereof thereby forming pointed tips and a canoe shape;
   a cover joining the top edges of said canoe shape and extending at both ends of said canoe shape between said cylindrical segments and said joined ends, said cover being the only support for said side walls; and
   a thin fin at each end of said joined side walls, said fins comprising extensions of said pointed tips.

2. The fitment in accordance with claim 1 further comprising a number of raised, spaced circumferential ribs disposed on exterior surfaces of said side walls.

3. The fitment in accordance with claim 2 wherein said ribs extend from end to end of said joined side walls.

4. The fitment in accordance with claim 1 further comprising a cylindrical neck extending co-axially with said common cylinder away from said side walls.

5. The fitment in accordance with claim 4 comprising a cap screw thread disposed about said cylindrical neck.

6. The fitment in accordance with claim 5 wherein said cap screw thread is disposed about an exterior surface of said cylindrical neck.

7. The fitment in accordance with claim 4 further comprising a flange extending radially outwardly from said neck between said cap screw thread and said canoe side walls.

* * * * *